(No Model.)
J. S. COPELAND.
GUN CLIP FOR BICYCLES.
No. 492,740. Patented Feb. 28, 1893.
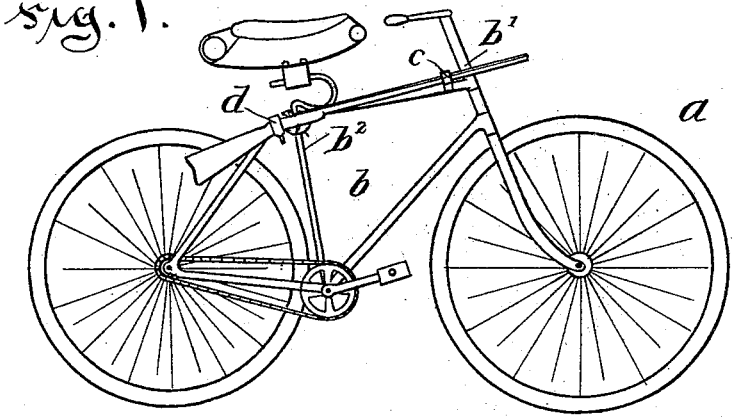
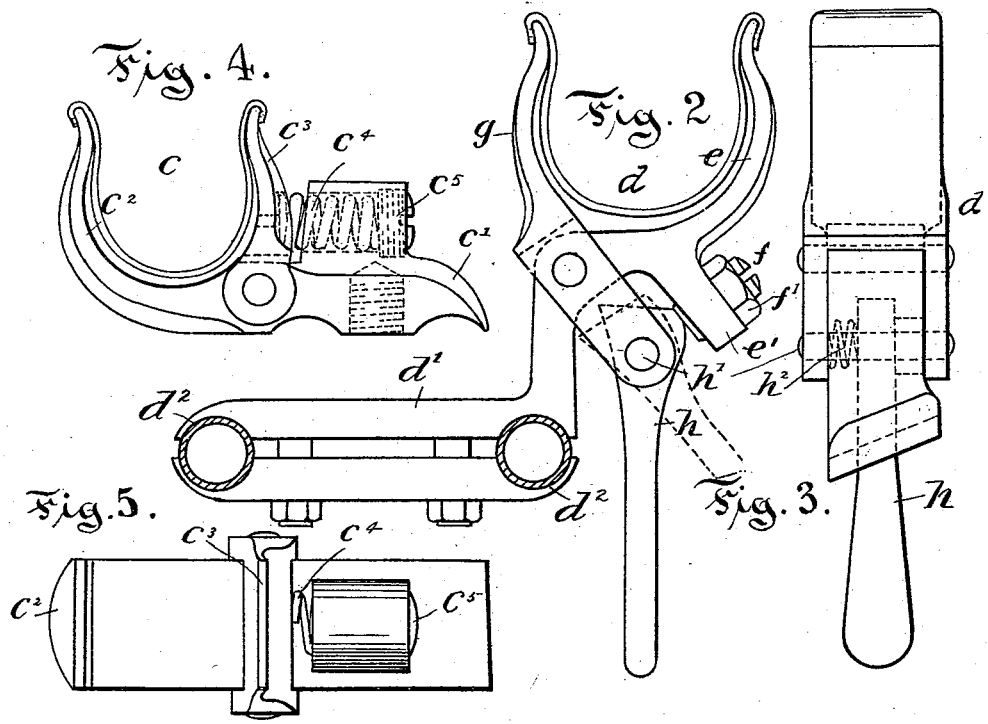
Witnesses:
Joseph Arthur Cantin
Arthur B. Jenkins
Inventor:
James S. Copeland,
by Chas. L. Burdett,
Attorney.

UNITED STATES PATENT OFFICE.

JAMES S. COPELAND, OF HARTFORD, CONNECTICUT, ASSIGNOR TO THE POPE MANUFACTURING COMPANY, OF BOSTON, MASSACHUSETTS.

GUN-CLIP FOR BICYCLES.

SPECIFICATION forming part of Letters Patent No. 492,740, dated February 28, 1893.

Application filed November 17, 1892. Serial No. 452,287. (No model.)

*To all whom it may concern:*

Be it known that I, JAMES S. COPELAND, of Hartford, in the county of Hartford and State of Connecticut, have invented certain new and useful Improvements in Gun-Clips for Bicycles, of which the following is a full, clear, and exact description, whereby any one skilled in the art can make and use the same.

The object of my invention is to provide a clip or clamp by means of which a rifle or gun may be securely fastened to the frame of a velocipede, bicycle or like vehicle, and by such means as will permit the prompt and ready removal of the gun from the clip.

To this end my invention consists in the details of the several parts making up the device as a whole and in the combination of such parts as more particularly hereinafter described and pointed out in the claims.

Referring to the drawings: Figure 1 is a detail side view of a bicycle showing a gun held in place by means of my improved clamp. Fig. 2 is a detail side view of the clamp on enlarged scale. Fig. 3 is a detail rear view of the upper part of one of the clamps on enlarged scale. Fig. 4 is a detail edge view of the front clamp on enlarged scale. Fig. 5 is a detail top view of the same on enlarged scale.

In the accompanying drawings the letter $a$ denotes a bicycle having a main frame $b$ of any ordinary construction and to this frame the clips $c$, $d$ are secured. The clips are preferably two in number one being secured to the upper member of the frame near the head $b'$ and the other fastened to the frame at a point usually back of the brace $b^2$, as shown in Fig. 1 of the drawings.

In order that the clips may be used for holding a military rifle so as to adapt the bicycle to the uses of cyclist infantry it is desirable that the clip shall be so made as to enable the rifle to be quickly removed from the grasp of the clips whenever desired without allowing any chance for the rifle to work loose or be accidentally displaced in using the bicycle. The rear clip $d$ comprises a frame $d'$, the base of which has on its under side sockets $d^2$ that fit upon the two members of the frame of the wheel back of the seat post, and an upright arm curved outward at its upper end shaped substantially to the outline of the small of the stock of the rifle. This forms one jaw $e$ of the main clamp. On the under side of the jaw is a projection $e'$ in which is arranged an adjustable stop $f$ that consists of a screw fitting a socket in the projection, the nut $f'$ arranged on the screw on the upper side of the projection forming a locking device by which the position of the stop may be determined.

A lever arm $g$ is pivoted to the frame of the clip and is provided at its lower end with a locking lever $h$ the head of which co-operates with a stop in determining the position of the upper arm of the lever $g$. This lever is mounted on a pin $h'$ and in order to hold the lever in a predetermined position a spring $h^2$ is placed between the side of the lever and the side of the socket as shown in Fig. 3. When the lever is arranged as shown in Fig. 2 of the drawings, or when it is thrown still farther toward the frame of the machine the stock of a rifle placed between the arms of the clamp will be securely held in place but the grasp of the clip upon the rifle is quickly released by throwing the lever outward as to the position indicated in dotted outlines. The lever is easily and quickly moved to either clamp or unclamp the rifle and the extent of movement of the holding lever can be regulated by changing the position of the stop $f$ within its threaded socket.

The front clamp $c$ comprises a base piece $c'$ with the upturned arm $c^2$ and also a swinging member $c^3$ that is pivoted to the frame of the clamp and has a limited swinging movement toward and from the fixed arm. This movable arm $c^2$ is normally thrust forward by a spring $c^4$ located in the socket back of the arm and thrusting outward, one end of the spring thrusting against the back of the arm $c^3$ and the other against the plug $c^5$ that forms the adjustable bottom of the socket in which the spring is located.

Both of these clips are preferably provided with a lining of soft material, as of leather, the strip being fastened to the upper ends of the clamp arms and hanging from them in position to support the rifle without danger of marring the parts by contact with any metallic portion of the clamps.

In order to secure the rifle to the frame of the wheel the locking lever of the rear clip is swung outward, the jaws of the clamp opened, the stock of the rifle placed between the jaws, the front part of the rifle is then forced down into the grasp of the arms of the front clamp and the lever then swung inward so as to clamp the jaws firmly on the stock of the rifle. When the device is in its position the rifle will be securely held against any removal whatever. The rifle is released by simply throwing the lever of the rear clip outward, the movable jaw of the front clip opening readily by an upward lifting movement after the stock of the rifle has been released. Both of these clips are secured in the desired place on the frame by means of bolts that pass through a removable lower section of the clip and sockets in the opposite section and are provided with nuts by means of which the clip is removably clamped upon the frame. If desired other means of securely fastening the clip in place on the frame may be adopted.

I claim as my invention—

1. In combination with the frame of a bicycle or like vehicle a gun clip secured to said frame provided with two holding jaws, one of said jaws pivoted to the frame of the clip and the swinging lever having a cam end adapted to thrust against the swinging jaw, all substantially as described.

2. In combination with the frame of a bicycle or like vehicle the removable gun clips one having a spring actuated yielding jaw and the other comprising the two holding jaws one of which is movable, the adjustable bearing block borne in a socket in the movable jaw, and the lever pivoted to the frame of the clip and having a cam end adapted to encounter the bearing block on the swinging jaw, all substantially as described.

JAMES S. COPELAND.

Witnesses:
ARTHUR B. JENKINS,
CHAS. L. BURDETT.